United States Patent [19]

Bartlett et al.

[11] 4,109,519

[45] Aug. 29, 1978

[54] DYNAMOMETER EMPLOYING MULTIPLE DISC BRAKE ASSEMBLIES

[75] Inventors: Harold H. Bartlett; Charles H. Herr, Jr.; Ivan R. Lamport, all of Peoria, Ill.

[73] Assignee: Caterpillar Tractor Co., Peoria, Ill.

[21] Appl. No.: 816,640

[22] Filed: Jul. 18, 1977

[51] Int. Cl.² .............................................. G01L 3/18
[52] U.S. Cl. ...................................................... 73/135
[58] Field of Search ............... 73/134, 135; 192/113 B

[56] References Cited

U.S. PATENT DOCUMENTS

| | | | |
|---|---|---|---|
| 854,720 | 5/1907 | Dawson | 73/135 X |
| 1,424,357 | 8/1922 | Hem | 73/134 |
| 2,347,208 | 4/1944 | Martin | 73/134 |
| 3,301,359 | 1/1967 | Cole et al. | 192/113 B X |
| 3,791,498 | 2/1974 | Wassermann | 73/134 X |

FOREIGN PATENT DOCUMENTS 538,820 8/1941 United Kingdom ...................... 73/134

*Primary Examiner*—Charles A. Ruehl
*Attorney, Agent, or Firm*—Wegner, Stellman, McCord, Wiles & Wood

[57] ABSTRACT

A disc brake dynamometer including a base, a shaft adapted to be coupled to a rotary motive source to be tested, a pair of axially spaced, fluid-cooled, disc brakes concentric about the shaft and each having two relatively rotatable members, one of the members of each brake being journalled on the shaft and being affixed to the base, thereby journalling the shaft on the base and the other of the two relatively rotatable members being connected to the shaft for rotation therewith, and a load measuring device connected to the members which are affixed to the base. Two embodiments are disclosed.

6 Claims, 3 Drawing Figures

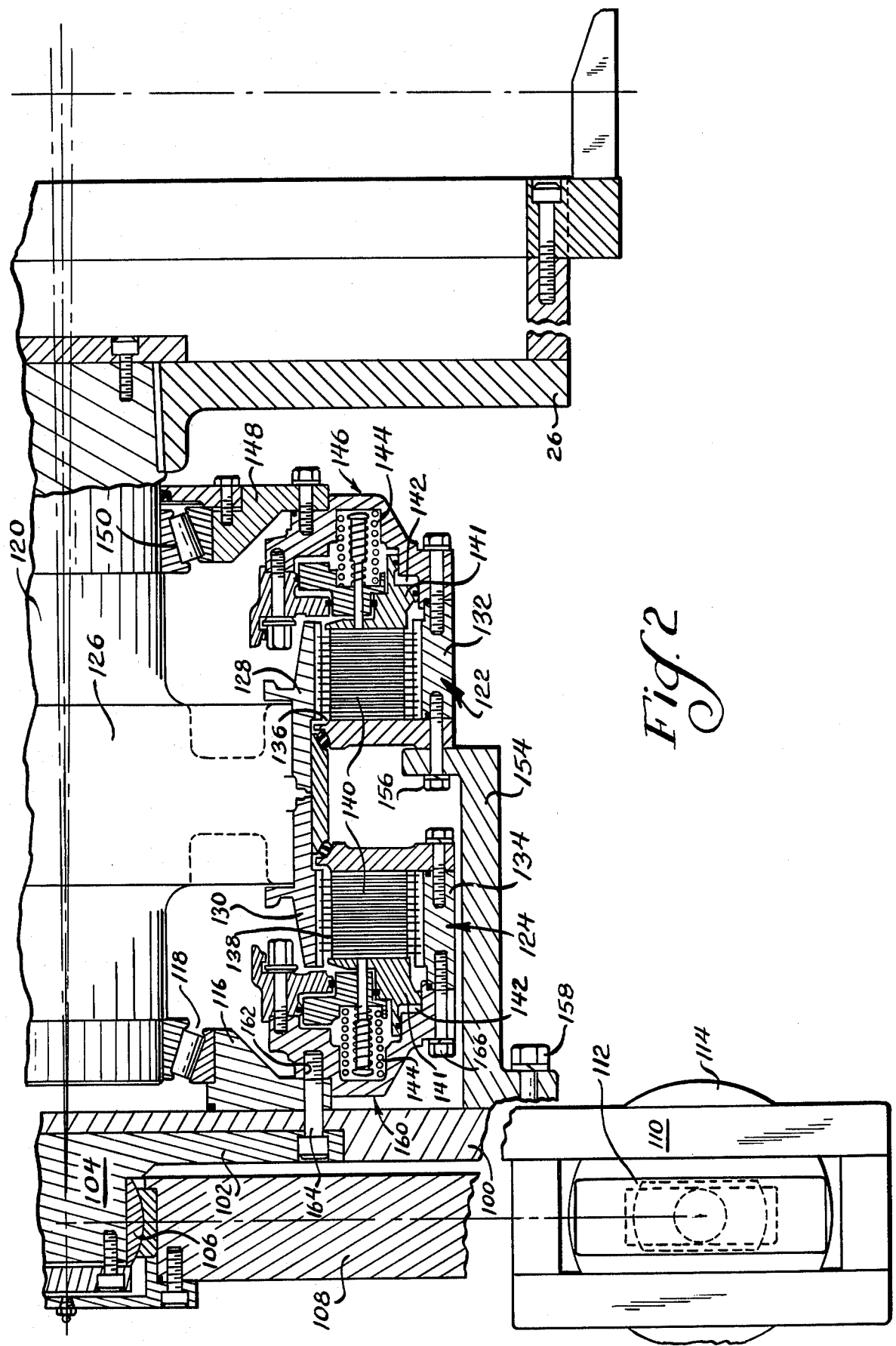

DYNAMOMETER EMPLOYING MULTIPLE DISC BRAKE ASSEMBLIES

BACKGROUND OF THE INVENTION

This invention relates to dynamometers and, more specifically, to dynamometers employing disc brake assemblies.

Manufacturers of large motive apparatus, such as construction vehicles, almost invariably test each unit produced to ensure that it is performing satisfactorily and up to its rated capability. In the case of construction vehicles, such testing has typically been performed on a test track or the like and great reliance is placed on the subjective judgement of the operator of the vehicle in determining whether the vehicle is satisfactory for shipping to a customer.

In order to obtain a more reliable measure of a vehicle's capability by eliminating the subjectivity involved on the part of the operator, it is highly desirable to utilize testing equipment, such as dynamometers, to provide more accurate measurement of torque outputs, matching of drive systems in hydrostatic drive systems, etc. However, it has been generally impossible to accomplish such measurement through the use of dynamometers in that the outputs of such vehicles frequently have high torque outputs at relatively low speeds, making measurement very difficult. While dynamometers have been proposed which are capable of performing inaccurate testing functions on such vehicles, they have been quite expensive to the point where the cost has proved to be virtually an absolute deterrent to their use.

Recently, the assignee of the present application has developed a low cost dynamometer suitable in testing such vehicles and which is based on the use of an oil-cooled, disc brake of the type frequently employed in large, off-the-road trucks. It appears that such dynamometers would prove quite successful in reliably testing large vehicles or other rotary mechanisms having rotary outputs which are of large size. However, due to the size of the disc brakes available for incorporation in such dynamometers, their use is limited to the testing of vehicles or the like of intermediate size or smaller. That is, the brake capacity of the disc brakes used therein is insufficient to enable such dynamometers to be employed in the testing of the behemoths of the product line.

Thus, there remains a need for a low cost dynamometer particularly suitable for monitoring rotary outputs of rotary mechanisms having high torque and relatively low output speeds and which are extremely large in size.

SUMMARY OF THE INVENTION

The present invention is directed to overcoming one or more of the above problems.

According to the present invention, there is provided a dynamometer including a base. Means, including a shaft, are adapted to be coupled to a rotary motive source to be tested. A pair of axially spaced, fluid-cooled disc brake assemblies are disposed concentrically about the shaft and each has two relatively rotatable members. One of the rotatable members of each brake is journalled on the shaft and is affixed to the base, thereby journalling the shaft on the base. The other of the rotatable members of each assembly is connected to the shaft for rotation therewith. A load or force measuring means is connected to the members of each assembly connected to the base.

As a result of the foregoing construction, the braking capacity of the dynamometer is essentially doubled, using available disc brake assemblies to provide a dynamometer capable of accurately measuring the outputs of extremely large power sources.

Other objects and advantages will become apparent from the following specification taken in connection with the accompanying drawings.

DESCRIPTION OF THE DRAWINGS

FIG. 2 is a sectional view of another embodiment of a dynamometer made according to the invention illustrating the components to one side of the center line thereof, it being understood that with the exception of the provision of load measuring means, the same is symmetrical about its center line.

DESCRIPTION OF THE PREFERRED EMBODIMENTS

Figure 1A:
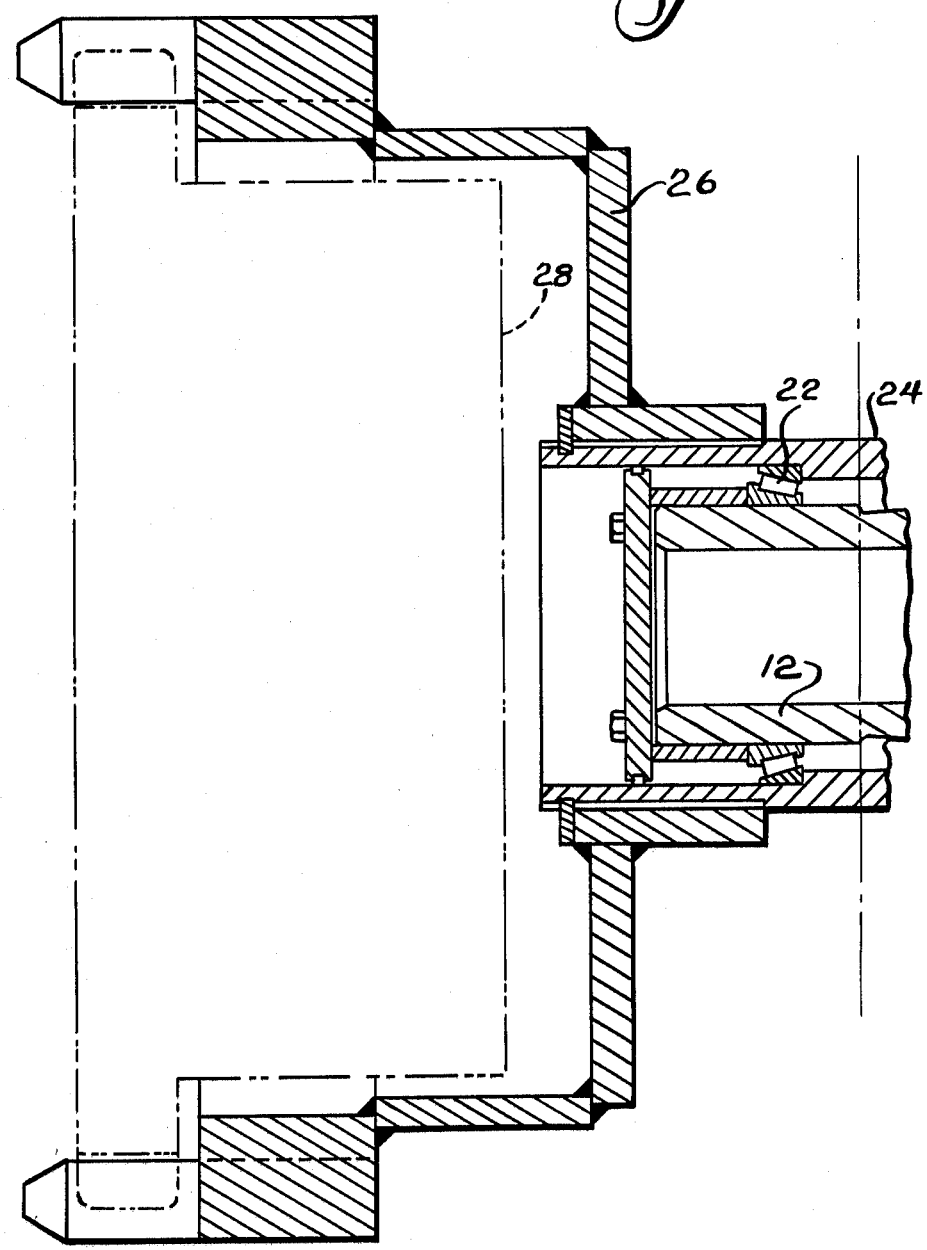
FIG. 1 is a sectional view of one embodiment of a dynamometer made according to the invention and is composed of FIG. 1A and FIG. 1B, the former being adapted to be placed to the left of the latter.

Two embodiments of a dynamometer made according to the invention are illustrated in the drawings and each is intended to be employed in a test stand such as that disclosed in the commonly assigned application of Bartlett et al., Ser. No. 763,315, filed Jan. 28, 1977, and entitled "Testing Apparatus", although not limited to use in such a stand. It is also to be understood that each dynamometer is ideally suited to be mounted in a base structure such as that disclosed in the commonly assigned application of Herr, Ser. No. 816,702, filed July 18, 1977, and entitled "Dynamometer Test Stand". The details of both of the above-identified applications are herein incorporated by reference.

Figure 1B:
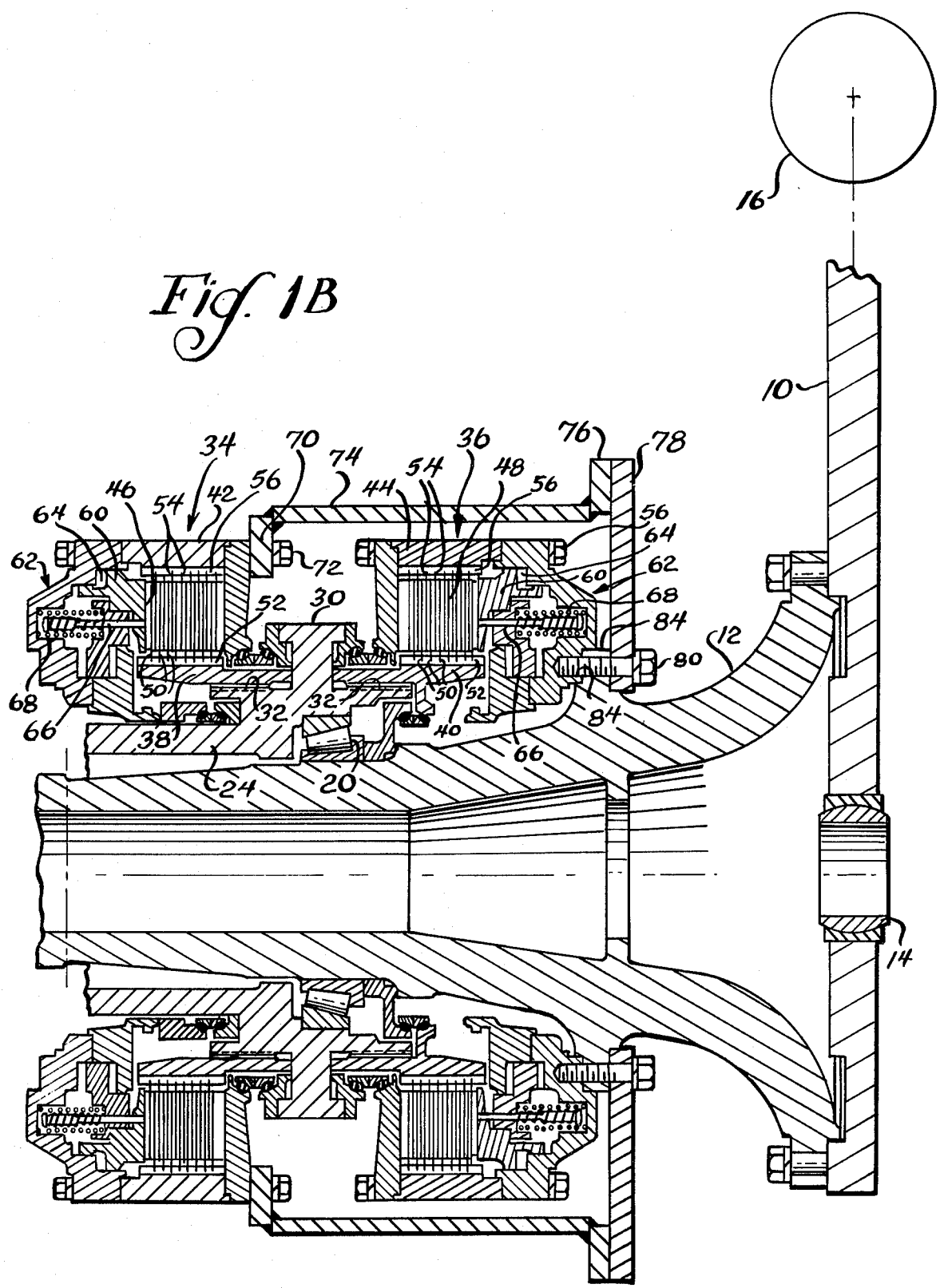

Turning now to FIG. 1, one embodiment of a dynamometer made according to the invention is illustrated and is seen to include a base including a base plate 10 and a spindle 12 extending from one side thereof. The base plate 10 will typically be mounted in a stand by means of a self-aligning, spherical bearing 14 disposed on the center line of the spindle for the purposes stated in the previously identified Herr application.

A force measuring device, shown schematically at 16, is connected to the base plate 10 and to the stand (not shown) to measure rotative force applied to the base plate 10 about the axis of the bearing 14 by a rotary input, as will be seen.

The spindle 12 may be part of the rear axle housing of an off-the-road vehicle inasmuch as disc brake assemblies utilized in the dynamometer are those commercially available for off-the-road vehicles with only minor modification thereto. The spindle 12, intermediate its ends, mounts a first bearing 20 and at its end remote from the base plate 10 mounts a second bearing 22. A hollow shaft 24 is journalled on the spindle 12 by the bearings 20 and 22 and at its end remote from the base plate 10, mounts a chuck 26, the precise configuration of which forms no part of the present invention.

The chuck 26 is adapted to be axially advanced onto a drive sprocket shown in dotted lines at 28 for a construction type vehicle or the like when the track has been removed. When the chuck 26 is engaged with the drive sprocket 28, and the latter is then rotated, the shaft 24 will tend to be driven on the bearings 20 and 22.

The end of the shaft 24 remote from the chuck 26 includes a radially outwardly directed peripheral flange 30 and radially outwardly opening splines 32 are disposed on both sides thereof. The splines 32 spline the shaft 24 to first and second oil-cooled, hydraulically engaged-spring disengaged disc brake assemblies, designated 34 and 36, respectively, and which, as mentioned, are basically conventional disc brakes used in large off-the-road vehicles.

More particularly, each of the disc brake assemblies 34 and 36 includes a first relatively rotatable member 38 and 40, respectively, which is located radially inwardly relative to the remainder of the associated assembly. Each also includes a generally radially outer, relatively rotatable member 42 and 44, respectively. The members 38, 40, 42 and 44 define annular, brake disc pack receiving chambers 46 and 48, respectively, and in each chamber there is disposed a brake disc pack wherein alternate brake discs 50 are axially slidable on splines 52 and nonrotatable with respect thereto, the splines 52 being on the radially inner members 38 and 40, respectively.

Interleaved with the brake discs 50 are brake discs 54 which are axially slidable on splines 56 on the inner surface of the members 42 and 44 and nonrotatable thereon. As a consequence, compressible brake disc packs are formed and the greater they are compressed, the greater the coupling between the radially inner members 38 and 40 and the radially outer members 42 and 44.

Each of the assemblies 34 and 36 includes an annular piston 60. Various end structures 62 of generally conventional configuration together with the pistons 60 define annular chambers 64 into which hydraulic fluid under pressure may be directed by conventional means (not shown) to axially advance the piston 60 to compress the associated one of the brake disc packs. Each piston 60 is connected by a rod 66 to a return spring assembly 68 of conventional construction so that when the pressure in the chamber 64 is released, the associated piston 60 will be retracted to relieve compressive pressure on the associated disc pack.

Means such as those disclosed in the above-identified application of Bartlett et al are employed for directing an oil coolant to the chambers 46 and 48 to absorb heat generated therein due to frictional engagement of the discs 50 and 54. Various seals are employed where indicated to seal the assemblage.

The radially outer members 42 and 44 of each disc brake assembly 34 and 36 are connected to the base 10 via the spindle 12. The member 42 of the assembly 34 has an annular ring 70 secured thereto as by bolts 72. A tubular shaft or housing 74 is welded to the exterior periphery of the ring 70 and extends about and surrounds the disc brake assembly 36. Its end opposite the ring 70 is secured to an annular ring 76 which is, in turn, secured by any suitable means to a radially outwardly directed, apertured plate 78. At its inner periphery, the plate 78 is bolted by means of a series of bolts 80 to a radially outwardly directed flange 82 on the spindle 12. The bolts 80 preferably extend through the flange 82 to be received in tapped bores 84 disposed in the end structure 62 of the disc brake assembly 36 which, in turn, is connected by bolts 86 to the radially outer member 44. As a consequence of this construction, frictional forces generated in each brake are independently transmitted to the spindle 12. That is, if the radially outer member 42 of the brake 34 were connected directly to the radially outer member 44 of the brake 36, the latter would not only have to transmit the forces generated in the brake 34 to the spindle 12, but those generated in the brake 36 as well.

In order to avoid overstressing the assembly 36, the housing 74 and the plate 78 define an independent force transmitting path to the spindle 12 so that each brake carries only the forces that are generated within its innards. In addition, the housing 74 provides a measure of protection for the apparatus in the event of a malfunction within the brake 36 by reason of its containment of the latter.

In general, the chamber 64 and each brake 34 and 36 are connected in parallel to a suitable controlled source of hydraulic fluid under pressure so that the force application in each brake tending to compress the associated pack will be the same. However, if desired, independent paths of fluid flow to the chambers 64 could be utilized as desired.

Turning now to FIG. 2, a further embodiment of the invention is illustrated. The embodiment shown in FIG. 2 has an advantage over the embodiment shown in FIG. 1 in terms of being more axially compact. Conversely, it makes lesser use of conventional parts such as the spindle 12. A base plate 100 is utilized and includes an insert 102 secured thereto having a stub 104 received in a bore of spherical bearing 106. The outer part of the spherical bearing 106 is mounted to a stand structure 108, generally as described in the previously identified application of Herr and the yoke 110 extends from the base plate 100 to be connected via a spherical bearing 112 to a load cell 114 which, in turn, is connected to the stand structure 108 by means not shown.

On one side of the base plate 100, a ring 116 secured thereto mounts a bearing 118 which, in turn, journals one end of a shaft 120. The end of the shaft 120 opposite from the bearing 118 mounts a chuck such as the chuck 26.

Concentric about the shaft 120 are first and second disc brake assemblies, generally designated 122 and 124, respectively. The shaft 120, intermediate its ends, mounts an enlarged diameter portion 126 which, by any suitable means such as splines (not shown), receives radially inner, splined, relatively rotatable members 128 and 130 of the brakes 122 and 124; and which correspond to the members 38 and 40 previously described. Radially outer splined members 132 and 134 for the brakes 122 and 124 and which correspond to the members 42 and 44 are provided and define disc brake pack receiving chambers 136 and 138, respectively. Brake discs 140 are disposed in each of the chambers and splined to the members 128, 130, 132 and 134 in the manner previously mentioned.

Each brake assembly 122 and 124 includes a piston 141 for compressing the associated pack in response to the admission of hydraulic fluid under pressure to chambers 142 and spring returns 144 are provided for each piston 141, all generally in the manner specified previously.

The end structure, generally designated 146, of the assembly 122 mounts an annular ring 148 which, in turn, mounts a bearing 150 which journals the shaft 120 adjacent the point of connection of the chuck 26 thereto. A tubular housing 154 surrounds the assembly 124 and is connected by bolts 156 to the radially outer member 132 of the brake 122 and by bolts 158 to the base plate 100.

The end structure of the brake assembly 124, generally designated 160, has tapped bores 162 therein by which cap screws 164 serve to secure the insert 102, the ring 116, and the end structure 160 to the base plate 100. Bolts 166, in turn, secure the end structure 160 to the radially outer member 134 of the brake assembly 124 such that the latter is effectively secured to the base plate 100.

From the foregoing, it will be appreciated that an inexpensive, high capacity dynamometer is provided according to the invention. Through the use of by and large conventional brake disc assemblies, costs are minimized and the same are capable of absorbing extremely high torques with smooth action even at extremely low rotational speeds. In both embodiments, the individual brakes are independently connected to the base plates so that neither must receive and transmit force generated in the other to eliminate the possibility of overstressing one or the other of the brake assemblies. The use of two brake assemblies doubles the capacity of the dynamometer over that attainable in the structure disclosed by either Bartlett et al or Herr and yet cost is maintained at a low level since, as noted, the brake assemblies are by and large conventional. As a consequence, the invention avoids the need for the development of an entirely new, higher capacity brake assembly than that used by Bartlett et al or Herr to minimize costs and yet provides the necessary capacity for testing extremely high output motive sources.

The embodiments of the invention in which an exclusive property or privilege is claimed are defined as follows:

1. In a dynamometer, the combination of:
   a base; means, including a shaft, adapted to be coupled to a rotary motive source to be tested;
   a pair of axially spaced, fluid-cooled, disc brakes concentric about said shaft and each having two relatively rotatable members, one of said members of each brake being journalled on said shaft and being affixed to said base thereby journalling said shaft on said base, the other of said members being connected to said shaft for rotation therewith;
   load measuring means connected to each said one member; and
   separate means connecting each said one member to said base whereby braking forces in each brake are transmitted independently to said base through respective ones of said separate means.

2. A dynamometer comprising:
   a base plate;
   a spindle extending from said base plate;
   a hollow shaft journalled on said spindle;
   a chuck affixed to one end of said shaft and adapted to be coupled to the rotary output of a rotary mechanism to be tested;
   first and second disc brake assemblies concentrically disposed about said spindle with one of said assemblies surrounding said shaft, said assemblies each having radially inner and radially outer relatively rotatable members defining respective brake disc receiving chambers, there being brake disc packs in each of said chambers with some of the discs in each chamber being nonrotatively coupled to the respective radially inner members and others of the discs in each chamber being nonrotatively coupled to the respective radially outer members, and a pair of means, one for each chamber, for compressing the associated brake disc pack within the associated chamber;
   means on the end of said shaft opposite said one end connecting said shaft to both said radially inner members;
   means connecting said radially outer members to said spindle through force transmitting paths which are independent of each other; and
   force measuring means connected to said second members.

3. The dynamometer of claim 2 wherein said spindle connecting means include a tubular housing connected to said one assembly and surrounding the other of said assemblies.

4. A dynamometer comprising:
   a base plate;
   a rotary shaft having one end journalled by said base plate and, at its other end mounting a chuck adapted to be engaged with the rotary output of a rotary mechanism to be tested;
   first and second axially spaced disc brake assemblies concentrically disposed about said shaft to one side of said base plate and each having first and second relatively rotatable members;
   means coupling said shaft to the first member of each of said assemblies;
   a pair of means respectively and independently coupling an associated one of said second members to said base plate;
   means carried by the second member of the disc brake assembly most remote from said base plate journalling said shaft intermediate its ends; and
   force measuring means connected to said second members.

5. A dynamometer comprising:
   a base plate;
   a spindle extending from said base plate and having a radially outwardly directed flange;
   a hollow shaft journalled on said spindle;
   a chuck affixed to one end of said shaft and adapted to be coupled to the rotary output of a rotary mechanism to be tested;
   first and second axially spaced disc brake assemblies concentrically disposed about said spindle with one of said assemblies surrounding said shaft, said assemblies each having radially inner and radially outer relatively rotatable members defining respective brake disc receiving chambers, there being brake disc packs in each of said chambers with some of the discs in each chamber being nonrotatively coupled to the respective radially inner members and others of the discs in each chamber being nonrotatively coupled to the respective radially outer members, and a pair of means, one for each chamber, for compressing the associated brake disc pack within the associated chamber;
   means between said disc receiving chambers coupling both said radially inner members to the other end of said shaft;
   means connecting one of said radially outer members directly to said flange;
   a tubular housing surrounding said one radially outer member and being connected to the other radially outer member;
   a radially outwardly directed plate connected to said flange and to said tubular housing; and
   force measuring means connected to said base plate.

6. A dynamometer comprising:
   a base plate;

a rotary shaft having one end journalled by said base plate and, at its other end mounting a chuck adapted to be engaged with the rotary output of a rotary mechanism to be tested;

first and second axially spaced disc brake assemblies concentrically disposed about said shaft to one side of said base plate and each having first and second relatively rotatable members;

means disposed between said assemblies coupling said shaft to the first member of each of said assemblies;

first means interconnecting the second member of one of said assemblies and said base plate;

second means including a tubular housing surrounding said one assembly interconnecting the second member of the other assembly and said base plate; and force measuring means connected to said base plate.

* * * * *